June 21, 1932.  E. FERRABINO  1,864,421
WHEEL FOR PNEUMATIC TIRES
Filed Feb. 13, 1929
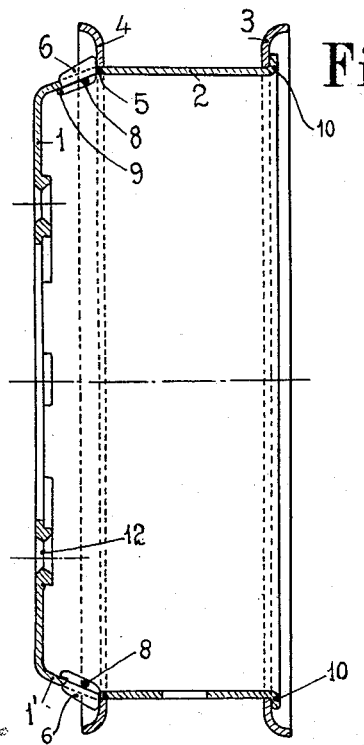
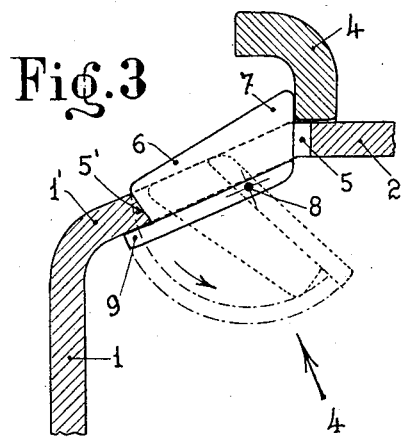
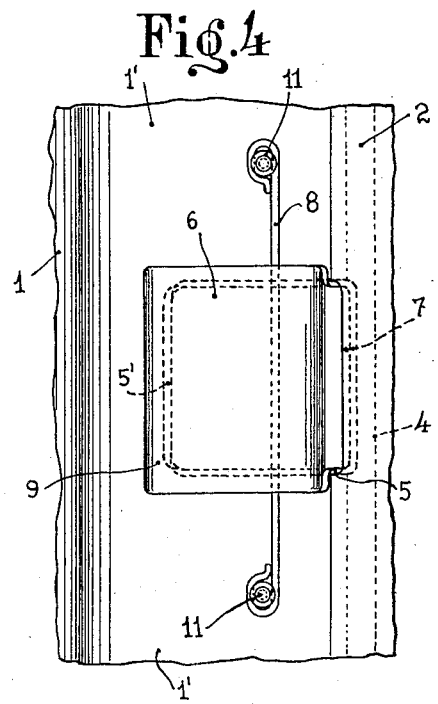
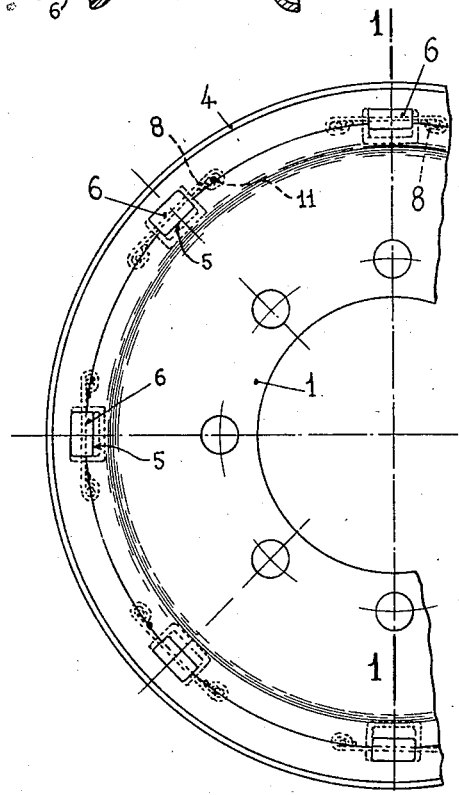
INVENTOR
Edoardo Ferrabino
by
Langner, Parry, Card & Langner
Att'ys.

Patented June 21, 1932                                          1,864,421

UNITED STATES PATENT OFFICE

EDOARDO FERRABINO, OF TURIN, ITALY

WHEEL FOR PNEUMATIC TIRES

Application filed February 13, 1929, Serial No. 339,719, and in Italy March 7, 1928.

The present invention relates to wheels with removable flanges and intended to carry pneumatic tires and has for its object a wheel of this class in which the removable flange is held in position on the rim by means of a series of locking members movably connected with the wheel and each able to be locked in operative position to provide an abutment for said flange and to be released in order to leave said flange free to be removed from the wheel rim.

On the annexed drawing is illustrated by way of example an embodiment of the present invention, and Figure 1 is a central section of the wheel on line 1—1 of Fig. 2;

Figure 2 is a fragmentary side view of the wheel;

Figure 3 is a fragmentary sectional view substantially similar to Fig. 1 but on an enlarged scale;

Figure 4 is a fragmentary front view viewed in the direction of arrow 4 in Fig. 3.

As shown on the drawing, the wheel comprises a disk 1 having means for mounting it on the wheel hub, as holes 12 for studs or other fastening members, and a rim 2 extending from disk 1 and having a rib 10 on its edge remote from said disk 1; a stationary flange 3 is engaged on the wheel rim 2 and abuts rib 10.

A flange 4 is removably located on the wheel rim 2 at the edge opposed to edge rib 10, the said flanges 4 and 3 cooperating to hold a pneumatic tire (not shown) engaged on the wheel rim 2.

In a frustro conical portion 1' connecting disk 1 with rim 2 beyond the operative position of flange 4, is provided a peripheral row of rectangular slots 5 spaced from each other, and in each of said slots is located a locking member 6.

Each locking member 6 comprises an upstanding lug 7 which projects beyond the surface of rim 2 to provide an abutment for flange 4 as shown in Fig. 3.

Each of said locking members 6—7 has a hole passing through it and said hole is engaged by securing member as a wire or metal cable piece 8, said piece 8 lying in the space within the wheel body and having its ends fastened on the surface of the wheel body by means of rivets 11 or similar fastening means, as shown in Figures 2 and 4.

Each locking member 6 has an inner extended or elongated projection 9 adapted to engage the edge of slot 5 preventing said member 6 from passing through slot 5, and the corner of the lug 7 adjacent to extension 9 engages a bevel edge 5' of slot 5 preventing member 6 from escaping from slot 5 by moving towards the interior of the wheel under the action of flange 4 on the lug 7.

Slot 5 in which each member 6 is seated has a longitudinal span which is larger than the longitudinal span of lug 7.

Assuming the parts to be in the full line position of the drawing and that an inflated tire is carried by the wheel rim 2, the outward pressure of the tire on flange 4 in a direction parallel to the wheel axis holds said flange forced on the lug 7 of locking member 6, and therefore the outer edge of lug 7 is held engaged with bevel edge 5' of the slot 5, each locking member being thus engaged in the position of Fig. 3 and holding in turn the flange 4 engaged on rim 2.

To remove the flange 4 and the tire, the tire is deflated and then the flange 4 may be easily moved inwardly towards stationary flange 3; thereafter each locking member 6 may be easily moved towards rim 2 due to the resilient character of the member 8 connecting it with disk portion 1' and thus the outer portion of lug 7 may be caused to move inwardly beyond bevel edge 5' or slot 5 by a rotation around connecting member 8 in the direction of arrow, to take the dotted position shown in Fig. 3.

The inner edges of lugs 7 of several locking members 6 are thus carried to positions flush with the disk portion 1' within the periphery of rim 2 as shown in dotted lines in Figure 3 and then the flange 4 may be removed.

After a fresh tire is located on the rim 2 and flange 4 is again located in position on rim 2, the tire being still in deflated condition, locking members 6 are carried back in full line position (Fig. 3) by an oscillation in a direction opposite to the direction of the arrow in Fig. 3 around fastening member 8 to carry lugs 7 in front of outer portion of flange 4; on the tire being inflated its pressure forces flange 4 against lugs 7 of the locking members 6 and these members are again firmly engaged in position by their outer portions being clamped on bevel outer edges 5' of slots 5.

What I claim as my invention and desire to secure by United States Letters Patent is:—

1. A wheel for pneumatic tires comprising a wheel rim, a flange on one edge of said rim and a removable flange on the other edge of said rim, said rim having a row of apertures beyond the position of said removable flange on said rim, locking members each free to move in one of said apertures, means for connecting each of said locking members with play with said rim, comprising a wire passing through each locking member, said wire lying on the inner surface of said rim and being engaged therewith at the sides of each locking member, a bevel surface on each locking member on its end remote from said removable flange, and a bevel surface on the cooperating edge of each aperture to releasably engage said first-mentioned bevel surface to lock said locking member in operative position under the pressure of an inflated tire located on said rim.

2. A wheel for pneumatic tires comprising a wheel rim, a flange on one edge of said rim and a removable flange on the other edge of said rim, said rim having a row of slots beyond the position of said removable flange on said rim, locking members each free to move in one of said slots, means for interconnecting each of said locking members and said rim with play and with freedom for each of said locking members to be pivotally moved around an axis intermediate its ends, said locking members providing abutments for holding said removable flange in position, a bevel surface on each locking member on its end remote from said removable flange, and a bevel surface on the cooperating edge of each slot to releasably engage said bevel surface to lock said locking member in operative position under the pressure of an inflated tire located on said rim.

3. A wheel for pneumatic tires comprising a wheel rim, a flange on one edge of said rim and a removable flange on the other edge of said rim, said rim having a row of slots beyond the position of said removable flange on said rim, locking members each free to move in one of said slots, flexible members each connected with said rim at the sides of one of said slots and engaging its cooperating locking member along an axis intermediate the ends of the same, said locking members providing abutments for holding said removable flange in position, and means on said locking members and cooperating parts for releasable engagement of said locking members in operative position under the pressure of an inflated tire located on said rim.

In testimony whereof I have signed my name to this specification.

EDOARDO FERRABINO.